(12) United States Patent
Jeong et al.

(10) Patent No.: US 10,989,183 B2
(45) Date of Patent: Apr. 27, 2021

(54) RECIPROCATING MOTOR AND RECIPROCATING COMPRESSOR HAVING A RECIPROCATING MOTOR

(71) Applicant: LG ELECTRONICS INC., Seoul (KR)

(72) Inventors: Sangsub Jeong, Seoul (KR); Ochang Gwon, Seoul (KR); Jungsik Park, Seoul (KR); Jongkoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 15/627,567

(22) Filed: Jun. 20, 2017

(65) Prior Publication Data
US 2017/0370354 A1 Dec. 28, 2017

(30) Foreign Application Priority Data

Jun. 23, 2016 (KR) .................. 10-2016-0078834

(51) Int. Cl.
*F04B 35/04* (2006.01)
*F04B 39/00* (2006.01)
(Continued)

(52) U.S. Cl.
CPC .......... *F04B 35/04* (2013.01); *F04B 35/045* (2013.01); *F04B 39/0005* (2013.01);
(Continued)

(58) Field of Classification Search
CPC ...... F04B 17/03–048; F04B 35/04–045; F04B 39/0005; F04B 39/10; F04B 39/12; H02K 33/16–18
(Continued)

(56) References Cited

U.S. PATENT DOCUMENTS 6,812,606 B2 * 11/2004 Kang .................. H02K 1/12
310/194
7,242,118 B2 * 7/2007 Sakamoto .............. H02K 33/16
310/15
(Continued)

FOREIGN PATENT DOCUMENTS

CN 1976183 6/2007
CN 102265489 11/2011
(Continued)

OTHER PUBLICATIONS

European Search Report dated Nov. 6, 2017.
(Continued)

*Primary Examiner* — Alexander B Comley
(74) *Attorney, Agent, or Firm* — KED & Associates LLP

(57) ABSTRACT

A reciprocating motor and a reciprocating compressor having a reciprocating motor are provided. The reciprocating motor may include a stator having a magnet coil, provided with an air gap respectively formed at both sides in an axial direction by interposing the magnet coil therebetween; a mover inserted into the stator, reciprocating with respect to the stator as at least one magnet is arranged at any one of the air gaps formed at both sides and a non-magnet is arranged at the other one of the air gaps; and a magnetic resonance spring that resonates the mover with respect to the stator using a force for moving toward low magnetic resistance between the mover and the stator. The reciprocating motor and the reciprocating compressor having a reciprocating motor may be downsized and lightweight, and may obtain high efficiency.

20 Claims, 10 Drawing Sheets

(51) Int. Cl.
  *F04B 39/10* (2006.01)
  *F04B 39/12* (2006.01)
  *H02K 33/16* (2006.01)
(52) U.S. Cl.
  CPC .............. *F04B 39/10* (2013.01); *F04B 39/12* (2013.01); *H02K 33/16* (2013.01)
(58) Field of Classification Search
  USPC ..... 417/417; 310/12.01, 12.04, 12.24–12.26, 310/15, 17, 19, 36, 49.01, 49.03, 49.05
  See application file for complete search history.

(56) References Cited

U.S. PATENT DOCUMENTS

| | | | | |
|---|---|---|---|---|
| 8,692,422 | B2* | 4/2014 | Al Otaibi | H02K 33/16 310/15 |
| 2004/0245862 | A1 | 12/2004 | Hong et al. | |
| 2007/0152517 | A1* | 7/2007 | Park | F04B 35/045 310/15 |

FOREIGN PATENT DOCUMENTS

| | | |
|---|---|---|
| CN | 102983704 | 3/2013 |
| CN | 105317652 | 2/2016 |
| EP | 2 107 671 | 10/2009 |
| JP | 11-187638 | 7/1999 |
| JP | 2005-151750 * | 6/2005 |
| JP | 2013-078263 | 4/2013 |
| KR | 10-0492615 | 5/2005 |
| KR | 10-0539813 | 12/2005 |
| WO | WO 2007/046610 | 4/2007 |

OTHER PUBLICATIONS

Chinese Office Action dated Feb. 2, 2019 with English Translation.
European Office Action dated Jul. 5, 2019.
Chinese Office Action dated Aug. 2, 2019 with English Translation.

* cited by examiner

| SECOND AIR GAP [mm] | MOVER CORE [mm] | ALPHA VALUE CHANGE [%] | MAGNETIC FORCE SPRING CONSTANT [N/m] |
|---|---|---|---|
| 0.5 | 3.25 | 100 | 26,900 |
| | 1.25 | 93 | 26,000 |
| | 0 | 92 | 23,600 |

RECIPROCATING MOTOR AND RECIPROCATING COMPRESSOR HAVING A RECIPROCATING MOTOR

CROSS-REFERENCE TO RELATED APPLICATION(S)

Pursuant to 35 U.S.C. § 119(a), this application claims the benefit of an earlier filing date of and the right of priority to Korean Application No. 10-2016-0078834, filed in Korea on Jun. 23, 2016, the contents of which are incorporated by reference herein in its entirety.

BACKGROUND

1. Field

A reciprocating motor and a reciprocating compressor having a reciprocating motor are disclosed herein.

2. Background

A motor is an apparatus for obtaining a rotational force or reciprocating force by converting electric energy to mechanical energy. This motor may be categorized into an alternating current motor and a direct current motor depending on a type of a power source which is applied thereto.

The motor includes a stator and a mover (or rotor). The mover provided with a magnet performs a rotary motion or a reciprocating motion depending on a direction of a flux generated when a current flows in a coil provided in the stator.

The motor may be categorized into a rotary motor and a reciprocating motor depending on a motion type of the mover. In a case of the rotary motor, the mover performs a rotary motion with respect to the stator by means of a flux formed in the stator by a power source applied to a magnet coil. In contrast, in a case of the reciprocating motor, the mover linearly performs a reciprocating motion with respect to the stator.

The reciprocating motor is obtained by modifying a flux of a motor, which has a stereoscopic structure, to a flat shape, and is a type of a motor a flat shaped mover of which is arranged on a flat shaped stator to linearly move depending on a change of a magnetic field of the stator. Recently, a reciprocating motor for a compressor has been introduced, in which a stator is formed in a cylindrical shape having an inner stator and an outer stator, a magnet coil that generates an Induced magnetic field at any one of the inner stator or the outer stator, and a magnet provided with a magnet pole arranged along an axial direction of the stator provided in a mover to allow the mover to reciprocate in an air gap between the inner stator and the outer stator.

The reciprocating motor for a compressor is disclosed in Korean Registered Patent No. 10-0492615 (hereinafter, referred to as "prior art 1") and Korean Registered Patent No. 10-0539813 (hereinafter, referred to as "prior art 2"), which are hereby incorporated by reference. In the prior art 1 and the prior art 2, an outer stator or inner stator of a cylindrical shape is formed by radially depositing a plurality of iron cores formed of thin plates on a ring shaped magnet coil.

The reciprocating motor is provided with a mechanical resonance spring of a compressed coil spring at each of both sides in a reciprocating direction of the mover to allow the mover to stably perform reciprocating motion. Therefore, when the mover moves backward and forward along a flux direction of a power source applied to the magnet coil, the mechanical resonance spring provided in a moving direction of the mover is compressed to accumulate a repulsive force. Subsequently, when the mover moves in an opposite direction, the mechanical resonance spring which has accumulated the repulsive force repeats a series of actions for pushing the mover.

However, the above-described conventional reciprocating motor has a problem in that the mover is supported by the mechanical resonance spring of a compressed coil spring but a specific period is not used as a driving frequency even within a driving frequency of a certain period due to resonance generated by the compressed coil spring. Further, according to the conventional reciprocating motor, as the mechanical resonance spring of a compressed coil spring is installed, there is a restriction, such as mechanical stress limit and vibration distance in view of properties of the compressed coil spring. For this reason, as the resonance spring should have a certain linear diameter and length, for example, there is a limitation in reducing a horizontal length of the reciprocating motor.

Furthermore, according to the conventional reciprocating motor, as the mechanical resonance spring of a compressed coil spring is installed, a spring support member for fixing both ends of the compressed coil spring should be provided in each of the mover and the stator, whereby a problem occurs in that a mechanical structure of the motor is complicated. Also, as a plurality of resonance springs should be pressurized at a high pressure to be installed at both front and rear sides of the mover, a problem occurs in that an assembly process becomes difficult.

Additionally, according to the conventional reciprocating motor, as the mover including a magnet is arranged between the outer stator and the inner stator to enable reciprocating motion, an air gap is formed at each of an outside and an inside based on the mover, whereby an entire air gap is increased, and thus, a problem occurs in that motor efficiency is deteriorated. Also, according to the conventional reciprocating motor, a total weight of the mover is increased due to a great thickness of a magnet frame for supporting a magnet, whereby power consumption is increased and an air gap between the outer stator and the inner stator is further increased, whereby a problem occurs in that motor efficiency is more deteriorated.

Finally, a reciprocating compressor to which the above reciprocating motor is applied still has the aforementioned problems of the reciprocating motor. For this reason, there is a limitation in downsizing the reciprocating compressor.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a reciprocating motor according to an embodiment and a reciprocating compressor having a reciprocating motor will be described with reference to the accompanying drawings. Where possible, like references numerals have been used to indicated like elements, and repetitive disclosure has been omitted.

The reciprocating motor of this embodiment reciprocates by means of a reciprocating centering force generated between a stator provided with a magnet coil and a magnet. The reciprocating centering force means a force for moving to low magnetic energy (low magnetic position energy, low magnetic resistance) when the magnet moves within a magnetic field. This force forms a magnetic spring.

Therefore, in this embodiment, when the magnet reciprocates by means of a magnetic force based on the magnet coil, the magnet accumulates a force to be restored in an air gap direction by the magnetic spring, and a mover including the magnet continuously reciprocates while resonating due to the force accumulated in the magnetic spring.

Figure 1:
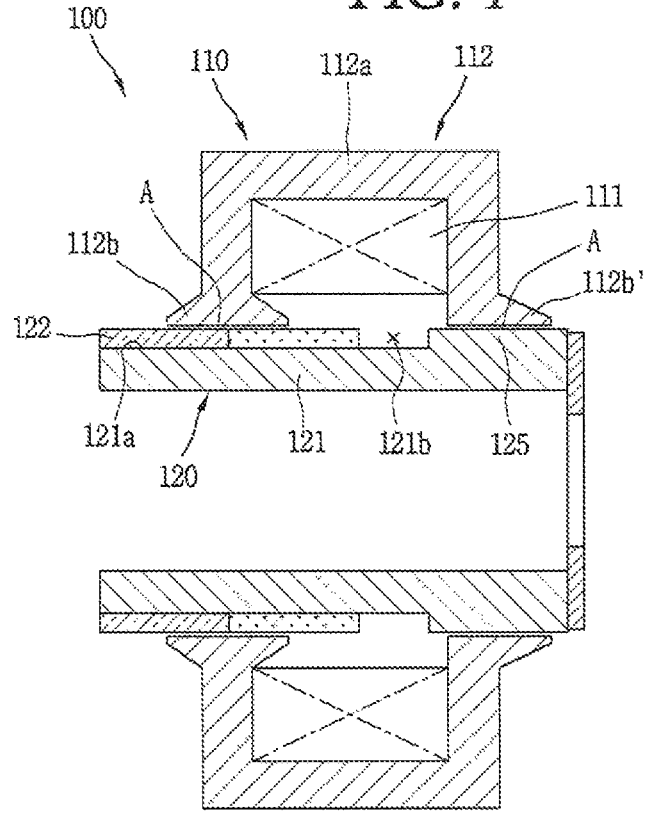
FIG. 1 is a cross-sectional view of a reciprocating motor according to an embodiment.
Figure 2:
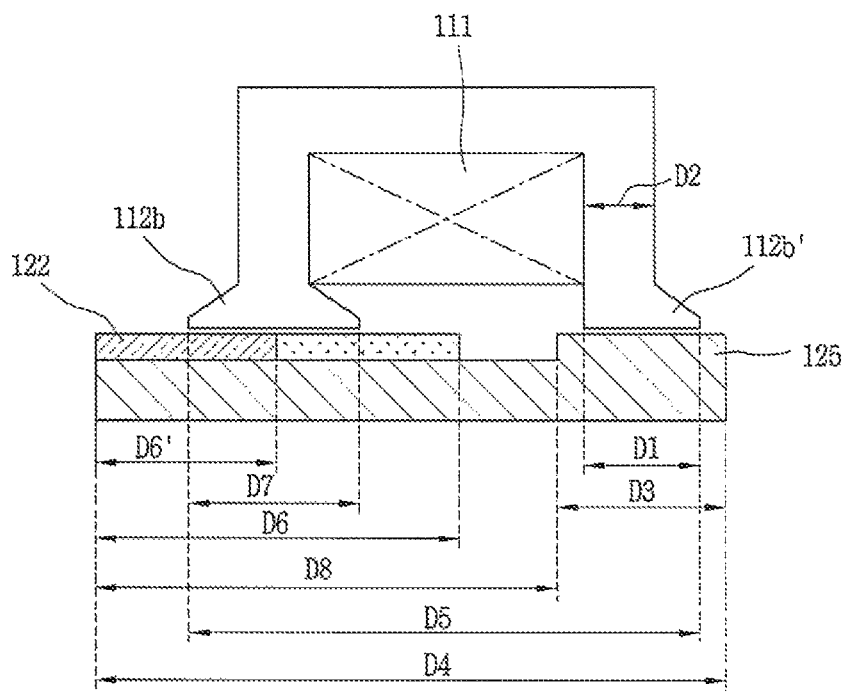
FIG. 2 is a cross-sectional view illustrating a stator and a mover in the reciprocating motor of FIG. 1.
Figure 3A:
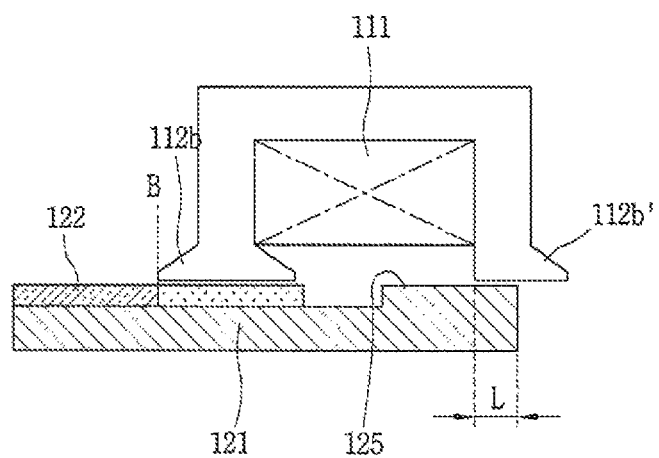
FIGS. 3A and 3B are cross-sectional views illustrating an overlap distance between a stator core and a core pole portion in the reciprocating motor of FIG. 2.
Figure 3B:
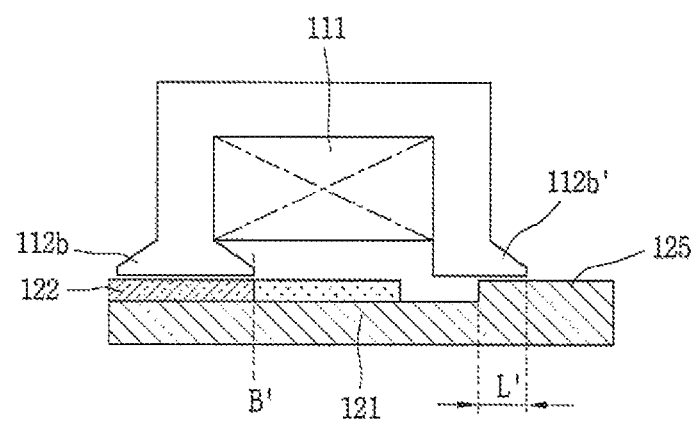

FIG. 1 is a cross-sectional view of a reciprocating motor according to an embodiment. FIG. 2 is a cross-sectional view illustrating a stator and a mover in the reciprocating motor of FIG. 1. FIGS. 3A and 3B are cross-sectional views illustrating an overlap distance between a stator core and a core pole portion in the reciprocating motor of FIG. 2.

As shown, the reciprocating motor 100 according to this embodiment is formed in such a manner that a mover 120 provided with a magnet 122 is inserted to an inside of a stator 110 provided with a magnet coil 111 at a predetermined air gap. A center of the magnet 122 is eccentric with respect to a center of the magnet coil 111 in a reciprocating direction of the stator 110 when the reciprocating motor 100 is not in operation or stopped, as shown in FIG. 1. The stator 110 may be formed by radially depositing a plurality of core blocks 112 on the magnet coil 111.

The core blocks 112 may be formed by depositing a plurality of stator iron cores formed in a predetermined shape and then pressing them in an arc shape. If the core blocks 112 are radially deposited on the magnet coil 111, their inner circumference forms a cylindrical shape. Therefore, the inner circumference of the core block 112 has a same air gap A as that of an outer circumference of the mover 120 along a circumferential direction.

In this case, as the core blocks 112 are formed by depositing the stator iron cores piece by piece, each stator iron core has a same shape as a circumferential shape of each core block 112. Therefore, the shape of the stator will be described as an example of the core block.

The core blocks 112 are entirely formed in a '⊏' shape during circumferential projection. However, although the core blocks 112 may be formed of a single part, the core blocks 112 may be formed by post-assembly of a plurality of blocks depending on their shape.

For example, if the core blocks 112 have a simple '⊏' shape, as the core blocks 112 may be deposited by being inserted onto the magnet coil 111, the core blocks 112 may be formed by a single part. However, if pole portions at both ends of the core block 112 are extended to the inside of the magnet coil 111, the '⊏' shaped core block 112 cannot be inserted into the magnet coil 111. Therefore, in this case, the core block 112 may be divided into both sides or its one end may be manufactured separately, whereby the core blocks 112 may be deposited by being matched with each other at both sides along an axial direction of the magnet coil 111. Hereinafter, a core block of an assembly state, which has the same shape as that formed by a single part, will be described.

The core block 112 may include a yoke portion or yoke 112a constituting a magnetic circuit, formed in a '⊏' shape, ends of which may include a first pole portion or pole 112b corresponding to the magnet 122, which will be described hereinafter, and a second pole portion or pole 112b' corresponding to a core pole portion or pole 125. Therefore, the reciprocating motor according to this embodiment constitutes a 2-gap motor having two air gaps.

As shown in FIG. 2, the first pole portion 112b may extend from an end of the yoke portion 112a connected therewith in a horizontal direction of both sides and then enlarged to be greater in width than the yoke portion 112a. The first pole portion 112b may have a width formed to be the same as or longer than a length of one magnetic pole if the magnet 122 has a plurality of magnetic poles. However, if the first pole portion 112b is too long, a change in a magnetic circuit may be delayed, whereby a length of the magnet 122 should be long. Therefore, the first pole portion 112b may be formed to be the same as or a little longer than the length of the magnetic pole.

As shown in FIGS. 3A and 3B, the second pole portion 112b' may be formed a length sufficient to overlap with the core pole portion 125, which will be described hereinafter, when the mover 120 reciprocates. For example, when one end of the first pole portion 112b is located in a middle B and B' of the magnetic pole (that is, a boundary between poles N and S, inter-pole boundary) of the magnet 122, overlap lengths L and L' of the second pole portion 112b' and the core pole portion 125 may be formed to be greater than at least zero.

In this case, the second pole portion 112b' may be formed in various manners. For example, the second pole portion 112b' may be formed to have a same width as a width of the yoke portion 112a, and may extend from the end of the yoke portion 112a connected therewith at both sides or one side, and thus, be enlarged to be greater than the width of the yoke portion 112a in the same manner as the first pole portion 112b.

Figure 4A:
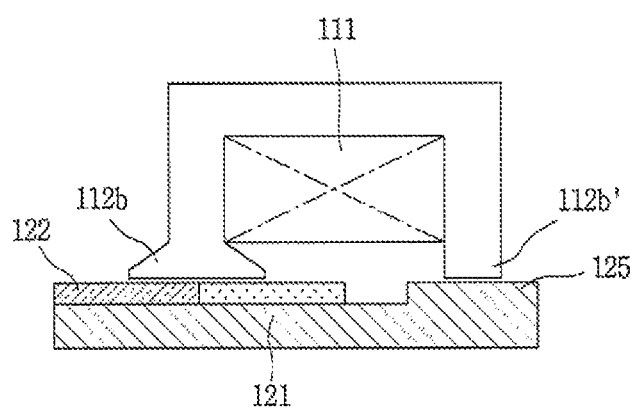
FIGS. 4A to 4C are longitudinal cross-sectional views illustrating each embodiment of a mover according to embodiments.
Figure 4B:
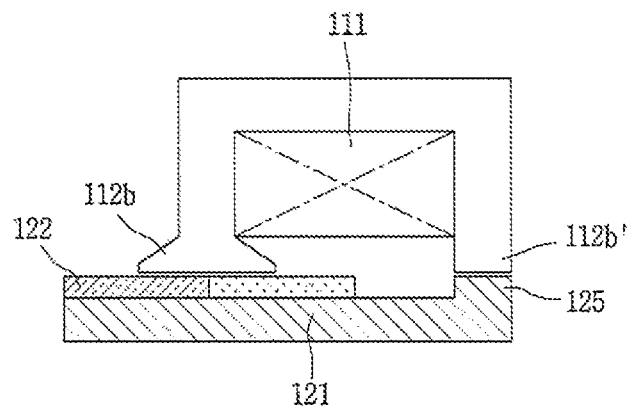
Figure 4C:
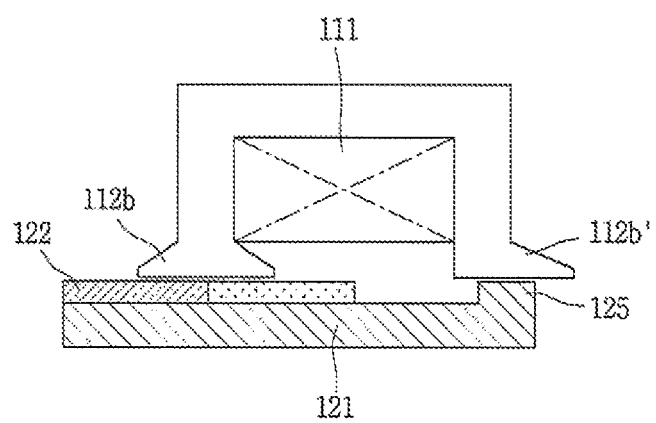

However, as a rigidity of the magnetic spring, its alpha value, and its alpha value variable rate are determined by combination of the second pole portion 112b' and the core pole portion 125 of the core, which will be described hereinafter, the length of the second pole portion 112b' may be determined in accordance with a design of a product to which the reciprocating motor is applied. FIGS. 4A to 4C are longitudinal cross-sectional views illustrating each embodiment of a mover according to embodiments. For reference, the alpha value may be defined as a torque constant in a rotational device and a thrust constant in a linear device, and may generally be defined as an organic voltage constant.

For example, as shown in FIG. 4A, a width D1 of the second pole portion 112b' may be formed to be the same as a width D2 of the yoke portion 112a and shorter than a length D3 of the core pole portion 125 of the mover 120 (hereinafter, embodiment ①). As shown in FIG. 4B, the width D1 of the second pole portion 112b' may be formed to be the same as the width D2 of the yoke portion 112a and the length D3 of the core pole portion of the mover 120 (hereinafter, embodiment ②). As shown in FIG. 4C, the width D1 of the second pole portion 112b' may be formed to be longer than the width D2 of the yoke portion 112a and the length D3 of the core pole portion of the mover 120 (hereinafter, embodiment ③).

Figure 5:
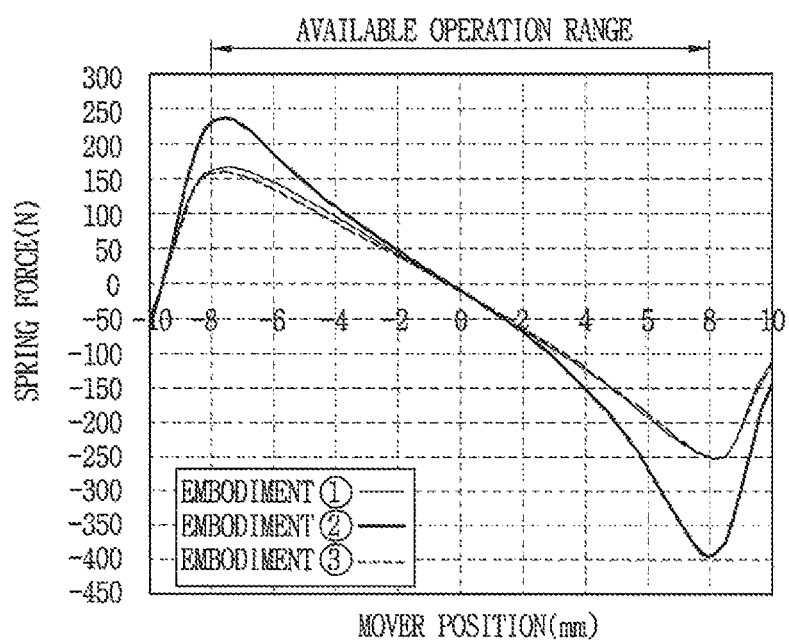
FIG. 5 is a graph illustrating comparison examples of spring rigidity in each embodiment.
Figure 6:
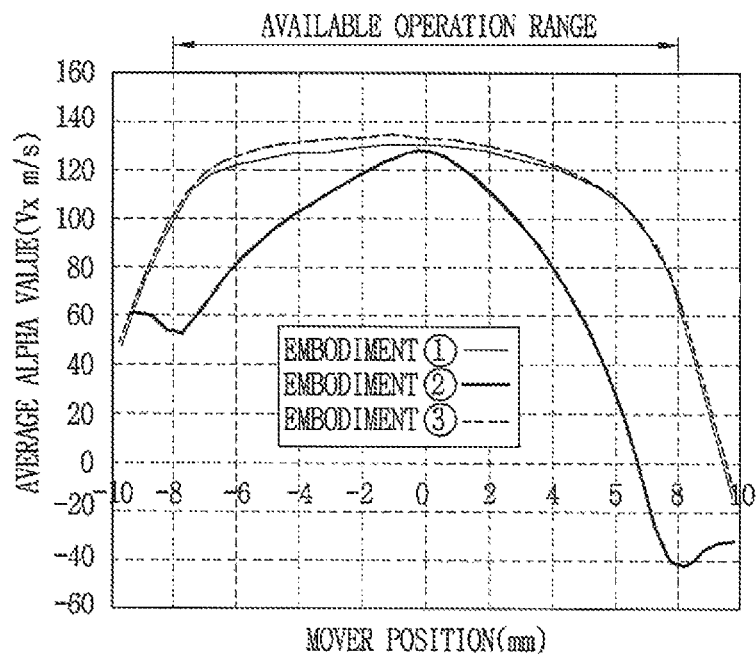
FIG. 6 is a graph Illustrating a change of an alpha value in each embodiment.

FIG. 5 is a graph illustrating comparison examples of spring rigidity in each embodiment. FIG. 6 is a graph illustrating a change of an alpha value in each embodiment.

As shown in the graph of FIG. 5, although spring rigidity of an operation area in the embodiment ① and the embodiment ③ is almost equally maintained, it is noted that spring rigidity of the operation area is remarkably increased in the embodiment ②. However, as shown in FIG. 6, although a spring alpha value of the operation area in the embodiment ① and the embodiment ③ is almost uniformly maintained without change, it is noted that the spring alpha value of the operation area is remarkably changed in the embodiment ②. For reference, the alpha value is an average alpha value (V/m/s) in an operation range, and the alpha value variable rate is a percentage value (%) obtained by dividing the average alpha value by a peak alpha value.

If the width D1 of the second pole portion 112b' is formed to be the same as the width D2 of the yoke portion 112a and the length D3 of the core pole portion 125 of the mover 120 like the embodiment ②, it is noted that rigidity of the magnetic spring is increased but the average alpha value in the operation area is reduced and the alpha value variable rate is remarkably increased. Therefore, the length D1 of the second pole 125 portion may be determined in an appropriate form if necessary with reference to the embodiments.

The mover 120 may be coupled to the magnet 122 attached to the outer circumference of the mover core 121 formed in a cylindrical shape. The mover core 121 may be formed of a magnetic material to form a magnetic circuit together with the stator core 112. For example, the mover core 121 may be formed in a cylindrical shape by radially depositing each sheet of mover iron cores in a same manner as the stator core 112, or may be formed in a single body in a same manner as powder metallurgy.

Also, the mover core 121 may be formed to be longer than a whole length D4 of the stator core 112, that is, an axial length D5 between an outer end of the first pole portion 112b and an outer end of the second pole portion 112b' in accordance with its reciprocating motion. Therefore, even though the mover core 121 reciprocates inside of the stator 110, at least any one of both ends of the mover core 121 does not depart from a range of the stator core 112.

Also, a magnet mounting surface 121a for coupling the magnet 122 is formed at one end of the mover core 121. The magnet mounting surface 121a may be formed to correspond to an axial sectional shape (or contact surface shape) of the magnet 122. For example, if a sheet of the magnet 122 is provided and its inner contact surface is a curved surface, the magnet mounting surface 121a may also be formed as a curved surface, and if the inner contact surface of the magnet 122 is a flat surface, the magnet mounting surface 121a may also be formed as a flat surface. If the magnet mounting surface 121a is formed as a curved surface, the magnet mounting surface 121a may be formed of a circular surface having a same curvature radius as a curvature radius of an inner circumference of the mover core 121. However, if the magnet mounting surface 121a is formed as a flat surface, an outer circumference of the mover core 121 constituting the magnet mounting surface may be formed in a polygonal shape.

As an axial length D6 of the magnet 122 is formed to be longer than a width D7 of the first pole portion 112b of the stator core 112, an axial length D8 of the magnet mounting surface 121a may be formed to be longer than the width of the first pole portion 112b of the stator core 112.

The axial length D8 of the magnet mounting surface may be formed to be longer than the axial length D6 of the magnet 122. Therefore, in a state in which one or a first end of the magnet 122 is matched with one or a first end of the mover core 121, a spaced portion or space 121b may be formed between the other or a second end of the magnet 122 and one or a first end of the core pole portion 125, which will be described hereinafter, as much as a certain interval.

However, as the case may be, the axial length D8 of the magnet mounting surface 121a may be formed to be the same as the axial length D6 of the magnet 122. If the axial length of the magnet mounting surface 121a is formed to be the same as the axial length D6 of the magnet, the second pole portion 112b' may be overlapped with or very close to the magnet 122 depending on its shape, whereby a flux at the second pole portion 112b' may leak toward the magnet 122. Therefore, the axial length D8 of the magnet mounting surface 121a may be formed to be longer than the axial length D6 of the magnet 122, such that the spaced portion 121b is formed between the magnet 122 and the core pole portion 125.

The magnet 122 may include of a 2-pole magnet having poles N and S (poles may be arranged in the order of S and N) along an axial direction. Also, the whole axial length D6 of the magnet 122 may be formed to be longer than the width length D7 of the first pole portion 112b of the stator core 112. However, each magnetic pole length D6' of the magnet 122, that is, axial length of the poles N and S may be formed so as not to be longer than the axial length D7 of the first pole portion 112b in view of a change in the magnetic circuit as described above.

A plurality of magnets 122 may be provided to be coupled to one another at a certain interval along a circumferential direction. However, as the case may be, the magnet 122 may be formed in a cylindrical shape to be pressed in the outer circumference of the mover core 121 or may be fixed by a separate fixed member, such as a ring.

If a reciprocating centering force between the magnet 122 and the magnet coil 112 is used, the mover 120 may reciprocate while excluding a separate mechanical resonance spring. As the magnet 122 should have an excellent coercive force with a flux density, an Nd magnet rather than a ferrite magnet may be applied to the magnet 122.

The core pole portion 125 may protrude in a radial direction toward the second pole portion 112b' at the other end of the mover core 121, that is, the other end corresponding to the second pole portion 112b' of the stator core 112. As a result, the mover may have a 3-poles of a 2-pole magnet and one core pole portion, and if the 3-poles are combined with an air gap of the stator, a 2-gap & 3-pole reciprocating motor may be formed. In this case, as three poles are formed in the two air gaps, a corresponding high magnetic force may be generated, whereby a high spring rigidity may be expected in view of the magnetic resonance spring.

At least one pole may use a non-magnet while exercising high spring rigidity, whereby a usage amount of the high cost magnet may be reduced, and thus, a manufacturing cost of the motor may be reduced. Of course, if the three poles are all formed of non-magnets or two poles are formed of magnetic materials, the manufacturing cost may be further reduced.

The core pole portion 125 may be formed as a single body with the mover core 121, or may be manufactured separately and then assembled in the mover core 121. The axial length D3 of the core pole portion 125 may be formed in combination with the second pole portion 112b' of the stator core 112 as described above. That is, as shown in FIG. 2, the axial length D3 of the core pole portion 125 may be formed to be longer than, the same as, or smaller than the width D1 of the second pole portion 112b'. An operation effect of the axial length of the core pole portion 125 formed as above has been described together with the axial length of the second pole portion 112b', and thus, will be omitted.

Also, the core pole portion 125 may be formed in a same shape as a shape of the magnet 122. That is, if the magnet 122 is formed in pieces, the core pole portion 125 may also be formed in pieces at a certain interval along a circumferential direction. If the magnet 122 is formed in a cylindrical shape, the core pole portion 125 may also be formed in a cylindrical shape.

A height of the core pole portion 125 may be formed to be the same as a height of the magnet 122.

The above-described reciprocating motor according to this embodiment may be operated as follows.

If an alternating current is applied to the magnet coil 111 of the reciprocating motor 100, an alternating flux is formed between the stator core 112 and the mover core 121. Then, the magnet 122 corresponding to the first pole portion 112b of the stator 112 reciprocates continuously while moving together with the mover core 121 along a flux direction.

Figure 7A:
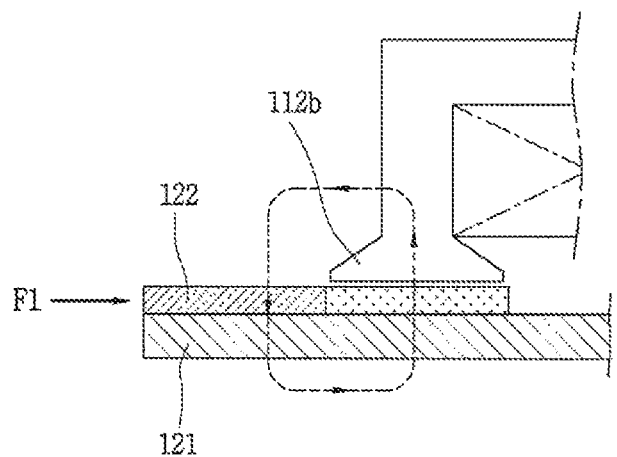
FIGS. 7A to 7C are views illustrating an operation of a reciprocating motor according to an embodiment.
Figure 7B:
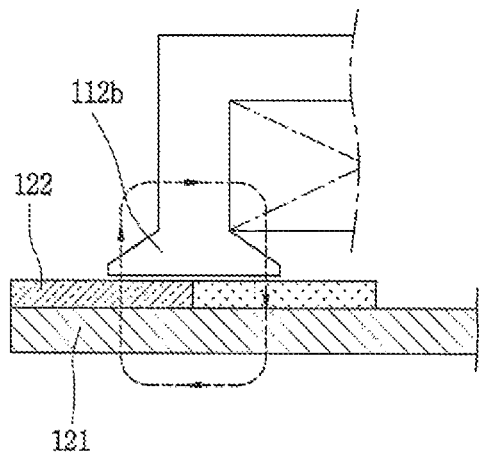
Figure 7C:
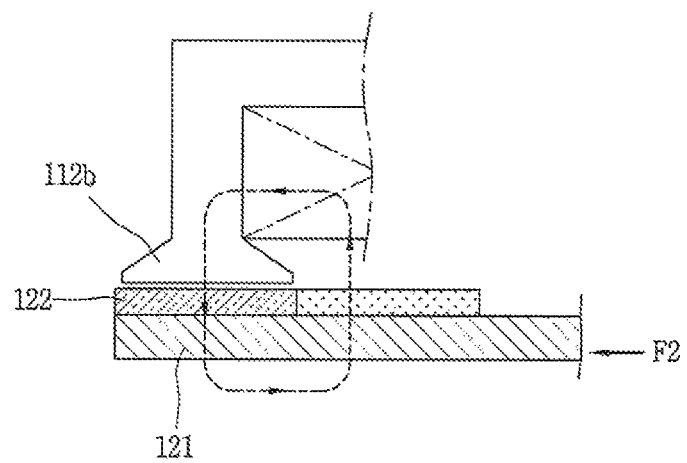

The magnet 122 reciprocates inside of the reciprocating motor 100 with respect to the stator core 112, and a magnetic resonance spring is formed between the magnet 122 and the stator core 112, whereby a resonance motion of the mover core 121 is induced. FIGS. 7A to 7C are views illustrating an operation of a reciprocating motor according to an embodiment.

For example, if the mover core 121 moves in a first direction (to the left side in the drawing) together with the magnet 122 by means of a magnetic force as shown in FIG. 7A, a reciprocating centering force F1 for returning in an air gap direction in which magnetic energy, that is, magnetic position energy or magnetic resistance, is low, that is, in a second direction (to the right side in the drawing) is accumulated between the magnet 122 and the stator core 112.

If a direction of a current applied to the magnet coil 111 is changed, the mover core 121 and the magnet 122 move in the second direction (to the right side in the drawing) by means of the magnetic force toward the air gap A generated by the magnet coil 111 and the accumulated reciprocating centering force F1 and return to the first pole portion 112b as shown in FIG. 7B.

Then, the mover 120 passes through the first pole portion 112b by means of an inertial force and a magnetic force and then moves in the second direction (to the right side of the drawing). At this time, if a current is applied to the magnet coil 111 in an opposite direction of FIG. 7B as shown in FIG. 7C, a magnetic pole as shown in FIG. 7A is formed in the first pole portion 112b, whereby an attractive force and a repulsive force are formed in each magnet 122 in the same direction as that of FIG. 7A, and the mover 120 moves in the first direction (to the left side in the drawing) as shown in FIG. 7C.

As the aforementioned reciprocating centering force F2 is accumulated between the magnet 122 and the stator core 112 in an opposite direction as shown in FIG. 7C, the mover 120 moves in the first direction (to the left side of the drawing) by means of the centering force and the magnetic force toward the air gap and repeats a series of reciprocating motions for returning to the first pole portion 112b like the mechanical resonance spring.

Another embodiment of a reciprocating motor will be discussed hereinafter. That is, the reciprocating motor includes a stator core and a mover core in the aforementioned embodiment, whereas a stator core constituting another inner stator may be further provided inside of the mover core in this embodiment.

Figure 8:
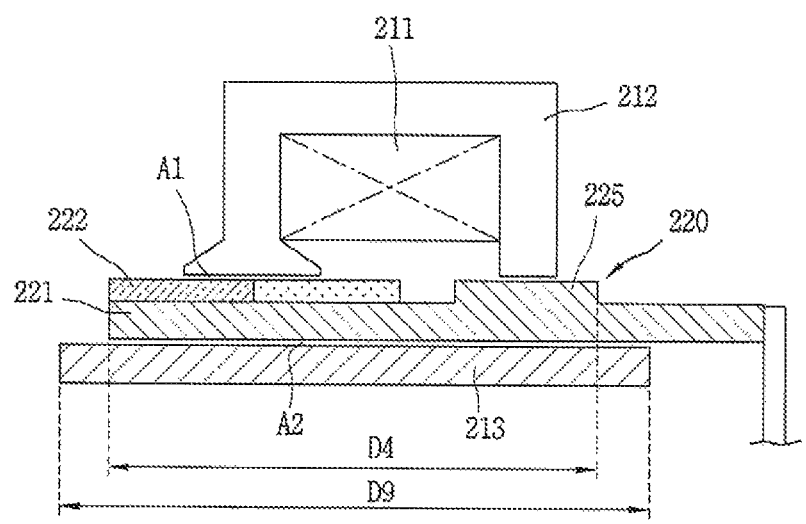
FIGS. 8 and 9 are longitudinal cross-sectional views illustrating another example of a mover in a reciprocating motor according to an embodiment.
Figure 9:
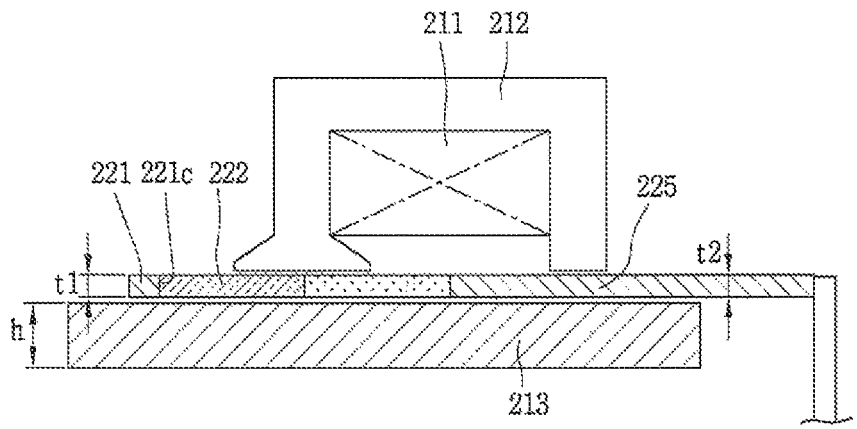

FIGS. 8 and 9 are longitudinal cross-sectional views illustrating another example of a mover in a reciprocating motor according to an embodiment. As shown in FIG. 8, the reciprocating motor according to this embodiment may include a first stator core 212 provided outside based on a mover core 221 to which a magnet 222 is attached, and a second stator core 213 provided inside based on the mover core 221.

The magnet coil 211 may be provided in the first stator core 212 provided outside considering mass production. However, it is not necessarily required to provide the magnet coil 211 in the stator core provided outside. Therefore, as the case may be, the magnet coil 211 may be provided in the stator core provided inside.

The second stator core 213 may be formed of a same material as that of the first stator core 212 to lower magnetic resistance. However, it is sufficient that the second stator core 213 is formed of a magnetic material.

Also, although an axial length D9 of the second stator core 213 may be formed to be the same as the axial length D4 of the mover core 221, the axial length D9 of the second stator core 213 may be formed to be longer than the axial length D4 of the mover core 221 to minimize flux leakage considering that the magnet 222 is attached to one end of the mover core 221. In this case, the second stator core 213 may be formed to be as long as a maximum distance for reciprocation of the mover 220.

A first air gap A1 may be formed between an inner circumference of the first stator core 212 and an outer circumference of the mover core 221, and a second air gap A2 may be formed between an inner circumference of the mover core 221 and an outer circumference of the second stator core 213.

The first air gap A1 and the second air gap A2 may be formed to be spaced apart from each other at a same interval. Core pole portion or pole 225 equivalent in height to the magnet 222 may be formed on the outer circumference of the mover core 221 corresponding to the second pole 212b' of the first stator core 212 constituting the first air gap A1.

The reciprocating motor provided with the mover core according to this embodiment may be similar to the aforementioned embodiment in basic configuration and operation effect. However, in this embodiment, the mover core 221 may be detached from the second stator core 213, whereby a weight of the mover core 221 may be remarkably reduced. Therefore, a high speed operation may be performed due to the weight lightening of the mover core.

A thickness t1 of the mover core 221 may be formed to be the same as a thickness t2 of the magnet 222, as shown in FIG. 9. In this case, the mover core 221 may be formed in a cylindrical shape, whereby a magnet mounting groove 221c may be formed at one side of the mover core 221 so that the magnet 222 may be inserted into the magnet mounting groove 221c, and the aforementioned core pole portion 225 may be formed at the other side of the mover core 221.

Also, in this case, a radial direction height 'h' of the second stator core 213, which serves as the inner stator, may be increased to obtain a greater area of a magnetic circuit. Therefore, although the thickness of the mover core 221 becomes thin or is almost removed as compared with the embodiment of FIG. 8, the alpha value of the motor and rigidity of the magnetic resonance spring may be prevented from being reduced.

This embodiment is similar to the embodiment of FIG. 8 in its configuration and operation effect. However, in this embodiment, the mover core is removed from the bottom of the magnet unlike the embodiment of FIG. 8, whereby the weight of the mover 220 may be further reduced to be more favorable for high speed operation.

Figure 10:
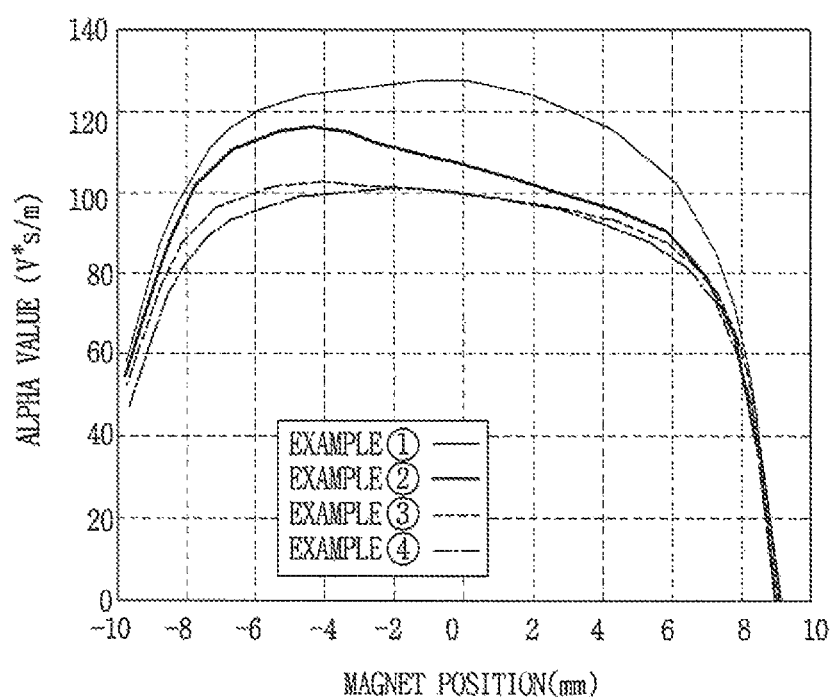
FIGS. 10 and 11 are graphs illustrating comparison examples of an alpha value per thickness of a mover core and rigidity of a magnetic resonance spring.
Figures 11, 12:
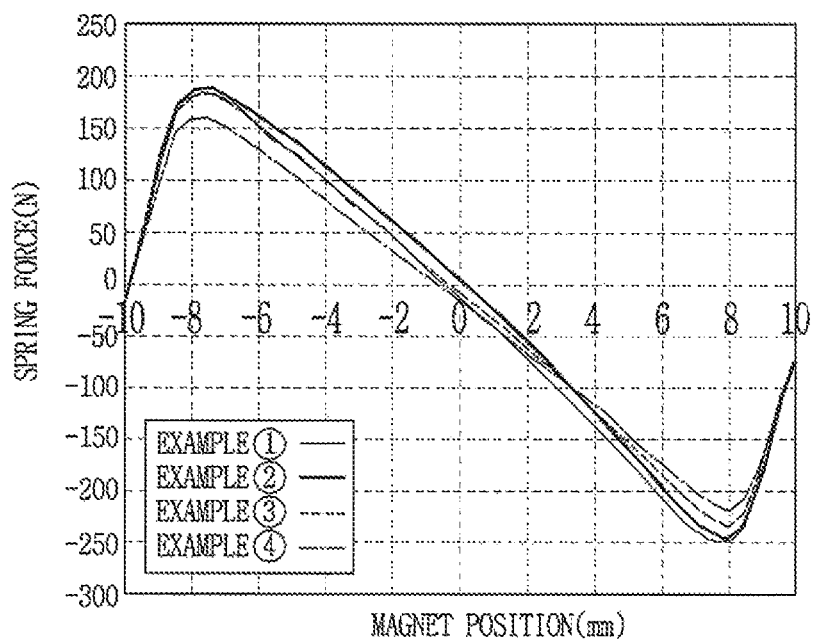
FIG. 12 is a table illustrating a summary of FIGS. 10 and 11.

FIGS. 10 and 11 are graphs illustrating comparison examples of an alpha value per thickness of a mover core and rigidity of a magnetic resonance spring. FIG. 12 is a table illustrating a summary of FIGS. 10 and 11. Referring to the graphs and table, it is noted that the alpha value and rigidity of the magnetic spring are reduced in examples ② and ③ corresponding to the embodiment of FIG. 8, and example ④ corresponding to the embodiment of FIG. 9 rather than example ① corresponding to the embodiment of FIG. 2.

As the alpha value in the reciprocating motor is generally proportional to an organic voltage constant or thrust constant per turn of the magnet coil, if the alpha value is too low, the current of the motor is increased, whereby copper loss is increased. This reduces motor efficiency and adversely affects a winding temperature during maximum overload. Therefore, an appropriate alpha value may be set to obtain a thickness of the mover core, which maintains the appropriate alpha value. In embodiments disclosed herein, as the thickness of the mover core may be controlled freely or the shape of the core pole portion and the shape of the pole portion of the stator corresponding to the core pole portion may be controlled freely, the alpha value may be set to obtain an appropriate range. Therefore, efficiency and reliability of the motor may be enhanced.

Also, as seen in the graph, the alpha value is high and there is little change in the alpha value. This means that there is no big difference in the alpha value between a center position of the magnet and both ends of the magnet in the operation range of the motor. This may prevent a control error, which may occur if there is big change in the alpha value, from occurring, thereby enhancing control reliability of a compressor.

Figure 13:
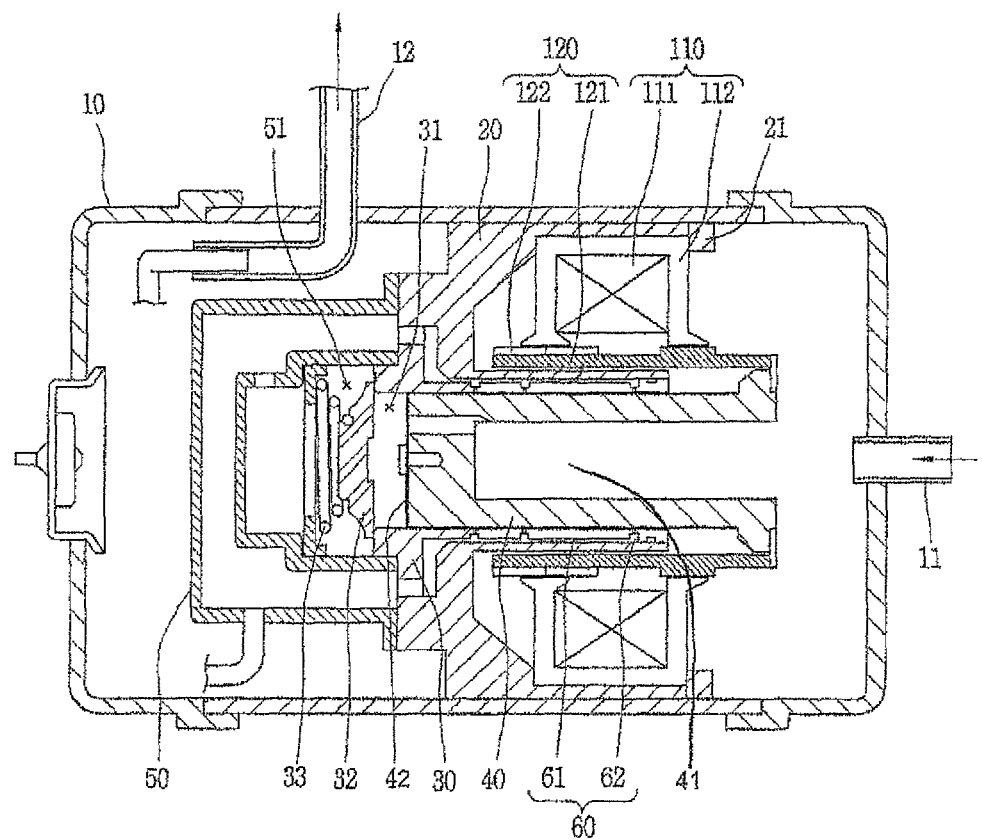
FIG. 13 is a longitudinal cross-sectional view illustrating an embodiment of a reciprocating compressor to which a reciprocating motor according to an embodiment is applied.

FIG. 13 is a longitudinal cross-sectional view illustrating an embodiment of a reciprocating compressor in which a reciprocating motor according to an embodiment is employed. As shown, in the reciprocating compressor according to this embodiment, a suction pipe 11 may be connected to an inner space of a sealed case 10, and a discharge pipe 12 that guides a refrigerant compressed in a compression space 31 of a cylinder 30, which will be described hereinafter, to a freezing cycle may be connected to one side of the suction pipe 11. Therefore, the inner space of the case 10 may be filled with the suction refrigerant to form a suction pressure, and the refrigerant discharged from the compression space 31 may be directly discharged to the outside of the case 10 toward a condenser through the discharge pipe 12.

A frame 20 may be provided in the inner space of the case 10, and a reciprocating motor 100 may be fixed to one side of the frame 20. The reciprocating motor 100 may generate a reciprocating force and at a same time induce a resonance motion of a piston 40, which will be described hereinafter.

The compression space 31 may be provided inside of the reciprocating motor 100, whereby the cylinder 30 inserted into the frame 20 may be coupled to the compression space 31, and the piston 40 may be coupled to the cylinder 30, where the piston 40 is inserted into the cylinder 30 to enable reciprocating motion and compresses the refrigerant by varying a volume of the compression space 31. A suction valve 42 that opens or closes a suction path 41 of the piston 40 may be coupled to a front end of the piston 40, and a discharge valve 32 that opens or closes the compression space 31 of the cylinder 30 may be detachably coupled to a front end of the cylinder 30 by being received in a discharge cover 50.

The discharge cover 50 may be provided with a discharge space 51 which may be fixed to the cylinder 30. The discharge valve 32 and a valve spring 33 that support the discharge valve 32 may be received in the discharge space 51 of the discharge cover 50, and an inlet of a gas bearing 50 for lubricating a space between the cylinder 30 and the piston 40 may be also received in the discharge space 51. The gas bearing 60 may include a gas passage 61 formed between an inner circumference of the frame 20 and an outer circumference of the cylinder 30, and a plurality of fine gas through holes 62 that passes through an inner circumference of the cylinder 30 from the middle of the gas passage 61.

The reciprocating motor 100 may have the configuration described in FIGS. 1 to 12. Therefore, the configuration of the reciprocating motor 100 will be understood with reference to the aforementioned reciprocating motor.

However, in this embodiment, the stator 110 may be located between the frame 20 and a back cover 21 and fastened to the frame 20 and the back cover 21 by a bolt, and the mover 120 may be fastened to the piston 40 by a bolt. Therefore, if the mover 120 reciprocates with respect to the stator 110, the piston 40 inserted into the cylinder 30 may reciprocate together with the mover 120.

In the aforementioned reciprocating compressor according to this embodiment, if an alternating current is applied to the magnet coil 111 of the reciprocating motor 100, an alternating flux may be formed between the stator 110 and the mover 120. Then, the magnet 122 may reciprocate continuously along a direction orthogonal to a direction of the flux formed between the stator 110 and the mover 120. The piston 40 coupled with the mover 120 may suction and compress the refrigerant while reciprocating inside of the cylinder 30, and the compressed refrigerant may repeat a series of processes of being discharged to the discharge space 51 by opening the discharge valve 32.

The magnetic resonance spring may be formed between the magnet 122 and the stator 110 in accordance with the reciprocating motion of the magnet 122 inside of the reciprocating motor 100, whereby the resonance motion of the mover 120 and the piston 40 may be induced. As a result, the piston 40 may compress the refrigerant while overcoming a gas force generated in the compression space 31.

The aforementioned reciprocating compressor according to this embodiment has the above-described operation effect according to the reciprocating motor 100 of FIGS. 1 to 12.

Therefore, the operation effect of the reciprocating compressor will be understood with reference to the above-described reciprocating motor.

Although a reciprocating compressor having a gas bearing has been described in the embodiments disclosed herein, the aforementioned embodiments may equally be applied to a reciprocating compressor having an oil bearing.

Embodiments disclosed herein provide a reciprocating motor which may use all frequencies within an operation frequency. Embodiments disclosed herein further provide a reciprocating motor which may be downsized in its entire size by reducing an axial length of a resonance spring. Embodiments disclosed herein also provide a reciprocating motor which may reduce manufacturing costs by simplifying a structure of a resonance spring, which allows a mover to perform a resonance motion with respect to a stator, and an assembly process.

Embodiments disclosed herein provide a reciprocating motor which may reduce a usage amount of a magnet while enhancing a spring rigidity of a resonance spring. Embodiments disclosed herein additionally provide a reciprocating motor which may enhance motor efficiency by reducing a weight of a mover to lower power consumption. Embodiments disclosed herein provide a reciprocating compressor which is downsized and lightweight by achieving objects discussed herein.

Embodiments disclosed herein provide a reciprocating motor that may include a stator having a magnet coil, provided with at least one or more air gaps; and a mover inserted into the stator, having a magnetic material arranged in the air gap to reciprocate by means of a flux generated by the magnet coil. The magnetic material may have a plurality of magnetic poles, and a number of the magnetic poles may be greater than or the same as a number of the air gaps. The number of the air gaps may be 2, and the number of the magnetic poles may be 3.

At least two of the three magnetic poles may be connected with each other and arranged in a reciprocating direction, and the other one may be arranged to be spaced apart as much as a certain interval in a reciprocating direction. The two magnetic poles which may be connected with each other may be made of permanent magnets, and the other one may be made of a non-magnet.

Embodiments disclosed herein provide a reciprocating motor that may include a ring shaped magnet coil; a plurality of stator pole portions or poles provided at both sides based on the magnet coil; and a plurality of mover pole portions or poles provided to correspond to the plurality of stator pole portions, reciprocating by means of a flux generated by the magnet coil. Any one of the plurality of mover pole portions may be a magnet, and the other one may be a non-magnet made of a magnetic material. The magnet may be characterized in that two different magnetic poles may be arranged in a reciprocating direction.

An overlap distance between the magnetic material and the stator pole portions may be greater than at least zero when a magnetic pole boundary of the magnet is matched with both sides of a reciprocating direction of the stator pole portions. The magnet and the non-magnet may be spaced apart from each other in a reciprocating direction.

Two air gaps and three poles may be formed between the stator pole portion and the mover pole portion, and the mover pole portion may reciprocate with respect to the stator pole portion by means of a force for moving toward low magnetic resistance between the mover pole portion and the stator pole portion. The mover pole portion may be resonated by a magnetic resonance spring generated by the magnet coil.

Embodiments disclosed herein provide a reciprocating motor that may include a stator having a magnet coil, provided with an air gap respectively formed at both sides in an axial direction by interposing the magnet coil therebetween; and a mover inserted into the stator, reciprocating with respect to the stator as at least one magnet is arranged at any one of the air gaps formed at both sides and a non-magnet is arranged at the other one of the air gaps. The magnet may be formed to have different magnetic poles in a reciprocating direction of the mover. The magnet may be provided with a spaced portion or space formed to be spaced apart from the non-magnet at a certain interval.

An axial length of the non-magnet may be formed such that at least a part of the non-magnet is located within an air gap range of the stator, when a magnetic pole boundary of the magnet is matched with an end of the air gap of the stator. The mover may include a mover core that supports the magnet, and the mover core may be provided on an inner circumference of the magnet.

A magnet mounting groove into which the magnet is mounted may be formed on an outer circumference of the mover core, and its axial length may be formed to be longer than an axial length of the magnet. Two air gaps and three poles may be formed between the stator and the mover. Two of the three poles may be magnets, and one pole may be a non-magnet. The mover may be configured to reciprocate with respect to the stator by means of a force for moving toward low magnetic resistance between the mover and the stator.

Embodiments disclosed herein provide a reciprocating compressor that may include a case having an inner space; a reciprocating motor arranged in the inner space of the case; a piston that reciprocates together with the reciprocating motor; a cylinder into which the piston may be inserted to form a compression space; a suction valve for that opens or closes a suction side of the compression space; and a discharge valve that opens or closes a discharge side of the compression space. The reciprocating motor may include of the above-described reciprocating motor.

The mover may be configured to reciprocate with respect to the stator by means of a force for moving toward low magnetic resistance between the mover and the stator. The mover may be configured to be resonated by a magnetic resonance spring generated by the magnet coil.

In the reciprocating motor according to embodiments disclosed herein, as the mover is resonated by the magnetic resonance spring, a usage frequency may be prevented from being restricted within an operation frequency of a certain period, whereby efficiency of the motor may be improved. Further, as the mover is resonated by the magnetic resonance spring, a number of parts for resonating the mover may be reduced, and a horizontal length of the motor may be more reduced.

Furthermore, as the mover is resonated by the magnetic resonance spring, the mover may be prevented from being deviated by a side force of the resonance spring, whereby friction loss and noise may be reduced. Also, the stator having a magnet coil may be formed to have two air gaps and the mover may be formed to have three poles, whereby a spring rigidity of the motor to which the magnetic resonance spring is applied may be further enhanced.

At least one of the three poles may be formed of a non-magnet, whereby a manufacturing cost of the motor may be reduced. A magnet frame for supporting the magnet may be removed or coupled to one end of the magnet to reduce a weight of the mover, whereby power consumption may be reduced to enhance motor efficiency. Also, as the reciprocating motor is provided, a reciprocating compressor which is downsized and lightweight may be provided.

Further scope of applicability will become more apparent from the detailed description. However, it should be understood that the detailed description and specific examples, while indicating embodiments, are given by way of illustration only, since various changes and modifications within the spirit and scope will become apparent to those skilled in the art from the detailed description.

The foregoing embodiments and advantages are merely exemplary and are not to be considered as limiting. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment" etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reciprocating motor, comprising:
a ring shaped magnet coil;
a plurality of stator poles provided at both sides of the magnet coil, wherein the plurality of stator poles comprises a first stator pole and a second stator pole; and
a plurality of mover poles provided to correspond to the plurality of stator poles and reciprocating by means of a flux generated by the magnet coil, wherein a first mover pole of the plurality of mover poles is a magnet, and a second mover pole of the plurality of mover poles is a non-magnet made of a magnetic material, wherein the first mover pole and the second mover pole are spaced apart from each other with an open space therebetween in a reciprocating direction, wherein a center of the first mover pole is eccentrically located with respect to the magnet coil in the reciprocating direction to be arranged at a center of the first stator pole and a center of the second mover pole is arranged at a center of the second stator pole in the reciprocating direction, when the motor is in an assembled, non-operating, and stopped state, and wherein one surface of the first mover pole in an axial direction defines one boundary of the open space, and one surface of the second mover pole in the axial direction defines another boundary of the open space.

2. The reciprocating motor of claim 1, wherein the first mover pole includes two different magnetic poles arranged in the reciprocating direction.

3. The reciprocating motor of claim 2, wherein an overlap distance between the second mover pole and the second stator pole of the plurality of stator poles is greater than zero when a magnetic pole boundary of the first mover pole is matched with both sides of the first stator pole of the plurality of stator poles in the reciprocating direction.

4. The reciprocating motor of claim 1, wherein two air gaps and three poles are formed between the plurality of stator poles and the plurality of mover poles, and the plurality of mover poles is reciprocated with respect to the plurality of stator poles by means of a force for moving toward low magnetic resistance between the plurality of mover poles and the plurality of stator poles.

5. The reciprocating motor of claim 1, wherein the plurality of mover poles is resonated by a magnetic resonance spring generated by the magnet coil, and wherein the magnetic resonance spring excludes a mechanical spring that is mechanically connected to the mover to provide an elastic force.

6. The reciprocating motor of claim 1, wherein the second mover pole is equal in length to the second stator pole.

7. The reciprocating motor of claim 1, wherein the second mover pole is greater in length than the second stator pole.

8. The reciprocating motor of claim 1, wherein the second mover pole is shorter in length than the second stator pole.

9. A reciprocating motor, comprising:
a stator having a magnet coil and provided with air gaps respectively formed at both sides in an axial direction with the magnet coil interposed therebetween; and
a mover inserted into the stator, reciprocating with respect to the stator, wherein at least one magnet is arranged at a first air gap of the air gaps formed at both sides and a core pole portion is arranged at a second air gap of the air gaps, wherein the core pole portion is formed of a non-magnet, wherein the mover includes a mover core that supports the magnet, the mover core being provided at an inner circumference of the magnet, wherein a magnet mounting groove into which the magnet is mounted is formed on an outer circumference of the mover core, wherein an axial length of the magnet mounting groove is formed to be longer than an axial length of the magnet, wherein a center of the magnet is eccentrically located with respect to a center of the magnet coil in a reciprocating direction to be arranged at a center of the first air gap and a center of the core pole portion is arranged at a center of the second air gap, in an assembled, non-operating, and stopped state, wherein the magnet is entirely spaced apart from the core pole portion by an open space at one side thereof in the axial direction, and wherein one surface of the magnet in the axial direction defines one boundary of the open space, and one surface of the core pole portion in the axial direction defines another boundary of the open space.

10. The reciprocating motor of claim 9, wherein the magnet is formed to have different magnetic poles in the reciprocating direction of the mover.

11. The reciprocating motor of claim 10, wherein an axial length of the core pole portion is formed such that at least a portion of the core pole portion is located within an air gap range of the second air gap, when a magnetic pole boundary of the magnet is matched with ends of the first air gap.

12. The reciprocating motor of claim 9, wherein two air gaps of the air gaps and three poles of the at least one magnet and the core pole portion are formed between the stator and the mover.

13. The reciprocating motor of claim 12, wherein two of the three poles are poles of the magnet, and one pole is the core pole portion.

14. The reciprocating motor of claim 13, wherein the core pole portion is made of a magnetic material.

15. The reciprocating motor of claim 14, wherein the mover reciprocates with respect to the stator by means of a force for moving toward low magnetic resistance between the mover and the stator, and wherein a magnetic resonance spring generated by the magnet coil excludes a mechanical spring that is mechanically connected to the mover to provide an elastic force.

16. A reciprocating compressor, comprising:
a case having an inner space;
a reciprocating motor arranged in the inner space of the case;
a piston that reciprocates together with the reciprocating motor;
a cylinder into which the piston is inserted to form a compression space;
a suction valve that opens or closes a suction side of the compression space; and
a discharge valve that opens or closes a discharge side of the compression space, wherein the reciprocating motor is the reciprocating motor of claim 9.

17. The reciprocating compressor of claim 16, wherein the mover reciprocates with respect to the stator by means of a force for moving toward low magnetic resistance between the mover and the stator.

18. The reciprocating compressor of claim 17, wherein the mover is resonated by a magnetic resonance spring generated by the magnet coil, and wherein the magnetic resonance spring excludes a mechanical spring that is mechanically connected to the mover and the piston to provide an elastic force.

19. The reciprocating compressor of claim 16, wherein the stator includes a first stator core and a second stator core, wherein the first stator core includes the magnet coil and the second stator core is provided inside of the first stator core with the mover interposed therebetween, and wherein an axial length of the second stator core is longer than an axial length of the first stator core.

20. The reciprocating compressor of claim 16, wherein an axial length between the magnet and the mover core is longer than a radial length.

* * * * *